US010808540B2

(12) United States Patent
Eastwood et al.

(10) Patent No.: US 10,808,540 B2
(45) Date of Patent: Oct. 20, 2020

(54) CASE FOR GAS TURBINE ENGINE

(71) Applicant: United Technologies Corporation, Farmington, CT (US)

(72) Inventors: Jonathan Jeffery Eastwood, West Hartford, CT (US); Curtis L. Memory, Manchester, CT (US); Jin Hu, Glastonbury, CT (US); Thomas J. Praisner, Colchester, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 203 days.

(21) Appl. No.: 15/928,133

(22) Filed: Mar. 22, 2018

(65) Prior Publication Data

US 2019/0292915 A1 Sep. 26, 2019

(51) Int. Cl.
*F01D 5/14* (2006.01)
*F15D 1/00* (2006.01)
(Continued)

(52) U.S. Cl.
CPC ............. *F01D 5/145* (2013.01); *F01D 9/041* (2013.01); *F01D 9/065* (2013.01); *F01D 25/24* (2013.01);
(Continued)

(58) Field of Classification Search
CPC .......... F01D 5/145; F01D 25/30; F01D 9/065; F01D 1/005; F01D 25/24; F01D 9/041;
(Continued)

(56) References Cited

U.S. PATENT DOCUMENTS 2,261,558 A * 11/1941 Orloff ..................... B64C 21/02
244/130
4,720,239 A * 1/1988 Owczarek ............... F01D 5/141
415/181
(Continued)

FOREIGN PATENT DOCUMENTS

DE 102004038930 2/2006
DE 102016003352 A1 * 9/2017 ............. F42B 10/38
(Continued)

OTHER PUBLICATIONS

EP Partial Search Report for EP Application No. 19164615.7 dated Jun. 4, 2019.
(Continued)

*Primary Examiner* — J. Todd Newton
(74) *Attorney, Agent, or Firm* — Carlson, Gaskey & Olds, P.C.

(57) ABSTRACT

A strut for a gas turbine engine includes an airfoil section extending in a spanwise direction between a first platform and a second platform, extending in a chordwise direction between a leading edge and trailing edge to define a chord length, and extending in a thickness direction between a first side and a second side to define a chord width. Exterior surfaces of the airfoil section define a leading portion between the leading edge and a widest location of the airfoil section relative to the thickness direction, and a trailing portion between the widest location and the trailing edge. The exterior surfaces establish a respective exterior contour for each span position between a 0% span position and a 100% span position. The exterior surfaces define a plurality of dimples in the leading portion.

17 Claims, 9 Drawing Sheets

(51) Int. Cl.
  *F01D 9/06*  (2006.01)
  *F01D 9/04*  (2006.01)
  *F01D 25/24*  (2006.01)
  *F01D 25/30*  (2006.01)
(52) U.S. Cl.
  CPC ............. *F01D 25/30* (2013.01); *F15D 1/005* (2013.01); *F05D 2240/121* (2013.01); *F05D 2240/127* (2013.01); *F05D 2240/14* (2013.01); *F05D 2250/60* (2013.01); *F05D 2270/17* (2013.01)
(58) Field of Classification Search
  CPC ............. F05D 2270/17; F05D 2250/60; F05D 2240/14; F05D 2240/127; F05D 2240/121
  USPC ....................................... 415/211.2
  See application file for complete search history.

(56) References Cited

U.S. PATENT DOCUMENTS

| | | | | |
|---|---|---|---|---|
| 5,337,568 A * | 8/1994 | Lee | ............ | F01D 5/18 |
| | | | | 416/236 R |
| 5,540,406 A * | 7/1996 | Occhipinti | ............ | B63B 1/248 |
| | | | | 244/198 |
| 5,851,105 A * | 12/1998 | Fric | ............ | F01D 25/162 |
| | | | | 415/208.1 |
| 5,996,233 A * | 12/1999 | Morabit | ............ | A01D 34/4168 |
| | | | | 30/276 |
| 6,139,258 A * | 10/2000 | Lang, III | ............ | F01D 5/141 |
| | | | | 415/115 |
| 6,183,197 B1 * | 2/2001 | Bunker | ............ | F01D 5/141 |
| | | | | 415/178 |
| 8,152,451 B2 * | 4/2012 | Manteiga | ............ | F01D 9/02 |
| | | | | 415/115 |
| 8,245,518 B2 * | 8/2012 | Durocher | ............ | F01D 9/065 |
| | | | | 415/142 |
| 8,371,812 B2 * | 2/2013 | Manteiga | ............ | F01D 9/02 |
| | | | | 415/115 |
| 9,422,864 B2 * | 8/2016 | Sakekar | ............ | F02C 7/00 |
| 9,482,096 B1 * | 11/2016 | Paesano | ............ | B63B 1/06 |
| 9,598,981 B2 * | 3/2017 | Salunkhe | ............ | F01D 25/30 |
| 10,240,532 B2 * | 3/2019 | Scott | ............ | F01D 9/065 |
| 2006/0099073 A1 * | 5/2006 | Djeridane | ............ | F28F 13/12 |
| | | | | 416/97 R |
| 2012/0227853 A1 * | 9/2012 | Bauer | ............ | F16L 9/006 |
| | | | | 138/177 |
| 2014/0186174 A1 * | 7/2014 | Malfa | ............ | F01D 25/24 |
| | | | | 415/220 |
| 2015/0143810 A1 * | 5/2015 | Salunkhe | ............ | F01D 9/041 |
| | | | | 60/772 |
| 2015/0143814 A1 | 5/2015 | Orosa | | |
| 2018/0030996 A1 * | 2/2018 | Schilling | ............ | F04D 29/388 |

FOREIGN PATENT DOCUMENTS

| | | | | |
|---|---|---|---|---|
| DE | 102016217093 | | 3/2018 | |
| EP | 2679793 | | 6/2012 | |
| EP | 2672064 | | 12/2013 | |
| EP | 2679793 | | 1/2014 | |
| EP | 2679793 A1 * | 1/2014 | ............ | F15D 1/005 |
| EP | 3543463 A2 * | 9/2019 | ............ | F01D 5/145 |
| FR | 3068727 A1 * | 1/2019 | ............ | F15D 1/003 |
| JP | 08014216 A * | 1/1996 | ............ | F15D 1/005 |
| WO | 9841739 | | 9/1998 | |
| WO | WO-2008033045 A1 * | 3/2008 | ............ | F15D 1/005 |
| WO | WO-2012048396 A1 * | 4/2012 | ............ | B64C 21/10 |
| WO | WO-2016083977 A1 * | 6/2016 | ............ | F15D 1/005 |

OTHER PUBLICATIONS

EP Extended Search Report for EP Application No. 19164615.7 dated Sep. 17, 2019.

* cited by examiner

CASE FOR GAS TURBINE ENGINE

STATEMENT REGARDING FEDERALLY SPONSORED RESEARCH OR DEVELOPMENT

This invention was made with government support under Contract No. W58RGZ-16-C-0046, awarded by the United States Army. The Government has certain rights in this invention.

BACKGROUND

This disclosure relates to engine cases, and more particularly to struts for a stator case.

A gas turbine engine typically includes a fan section, a compressor section, a combustor section and a turbine section. Air entering the compressor section is compressed and delivered into the combustor section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

Turbine engines typically include a turbine exhaust case (TEC) that guides exhaust flow from the turbine section. The TEC can have two rings defining inner and outer boundaries to guide the exhaust flow exiting the engine. The rings can be interconnected by struts to support the inner ring.

SUMMARY

A strut for a gas turbine engine according to an example of the present disclosure includes an airfoil section extending in a spanwise direction between a first platform and a second platform, extending in a chordwise direction between a leading edge and trailing edge to define a chord length, and extending in a thickness direction between a first side and a second side to define a chord width. The exterior surfaces of the airfoil section define a leading portion between the leading edge and a widest location of the airfoil section relative to the thickness direction, and a trailing portion between the widest location and the trailing edge. The exterior surfaces establish a respective exterior contour for each span position between a 0% span position and a 100% span position, and a ratio of the chord width to the chord length of at least 1:2 for at least some span positions. The exterior surfaces define a plurality of dimples in the leading portion.

In a further embodiment of any of the foregoing embodiments, the trailing portion is free of any dimples.

In a further embodiment of any of the foregoing embodiments, at least one dimple of the plurality of dimples is separated from the leading edge by a first distance of no more than 5% of a second distance between the leading edge and the trailing edge along the exterior contour for at least some of the span positions.

In a further embodiment of any of the foregoing embodiments, at least one dimple is defined along the leading edge.

In a further embodiment of any of the foregoing embodiments, the plurality of dimples extend across a localized region of the exterior surfaces, a remainder of the exterior surfaces defines a second region free of any dimples, and a ratio of the localized region to the second region is between 1:2 and 1:4.

In a further embodiment of any of the foregoing embodiments, the plurality of dimples are distributed in the localized region such that the localized region has a density of between 3.41 and 4.34 dimples per square centimeter.

In a further embodiment of any of the foregoing embodiments, the trailing portion is free of any dimples.

In a further embodiment of any of the foregoing embodiments, each dimple of the plurality of dimples in the localized region has a surface area, and a ratio of a sum of the surface area of each dimple within the localized region to a total area of the localized region is between 1:3 and 1:4.

In a further embodiment of any of the foregoing embodiments, the localized region has a density of between 3.41 and 4.34 dimples per square centimeter at a majority of span positions.

In a further embodiment of any of the foregoing embodiments, the first side is a pressure side and the second side is a suction side.

In a further embodiment of any of the foregoing embodiments, the first platform and second platform are respective portions of an inner ring and outer ring of a stator case.

A turbine exhaust case according to an example of the present disclosure includes an inner ring extending along an axis; an outer ring extending at least partially about the inner ring; and a plurality of circumferentially spaced apart struts extending radially between the inner ring and the outer ring with respect to the axis. Each strut of the plurality of struts includes an airfoil section extending in a spanwise direction between the inner ring and the outer ring, extending in a chordwise direction between a leading edge and trailing edge to define a chord length, and extending in a thickness direction between a first side and a second side to define a chord width. The exterior surfaces of the airfoil section define a leading portion between the leading edge and a widest location of the airfoil section relative to the thickness direction, and a trailing portion between the widest location and the trailing edge. The exterior surfaces establish a respective exterior contour for each span position between a 0% span position and a 100% span position; and at least one dimple of the plurality of dimples is separated from the leading edge by a first distance of no more than 5% of a second distance between the leading edge and the trailing edge along the exterior contour.

In a further embodiment of any of the foregoing embodiments, the plurality of dimples extend across a localized region of the exterior surfaces, a remainder of the exterior surfaces defines a second region free of any dimples, and a ratio of the localized region to the second surface area is between 1:2 and 1:4.

In a further embodiment of any of the foregoing embodiments, each dimple of the plurality of dimples in the localized region has a surface area, and a ratio of a sum of the surface area of each dimple within the localized region to a total area of the localized region is between 1:3 and 1:4.

In a further embodiment of any of the foregoing embodiments, the trailing portion is free of any dimples.

A gas turbine engine according to an example of the present disclosure includes a compressor section, a turbine section; and a stator case comprising an inner ring extending along an engine axis; an outer ring extending at least partially about the inner ring; and a plurality of circumferentially spaced apart struts extending radially between the inner ring and the outer ring with respect to the axis. Each strut includes an airfoil section extending in a spanwise direction between the inner ring and the outer ring, extending in a chordwise direction between a leading edge and trailing edge to define a chord length, and extending in a thickness direction between a first side and a second side to define a chord width. The exterior surfaces of the airfoil section define a leading portion between the leading edge and a widest location of the airfoil section relative to the thickness direction, and a trailing portion between the widest location and the trailing edge. The exterior surfaces establish a respective exterior contour for each span position between a 0% span position and a 100% span position. The exterior surfaces define a plurality of dimples in the leading portion; and two or more dimples of the plurality of dimples are defined along the leading edge.

In a further embodiment of any of the foregoing embodiments, the plurality of dimples extend across a localized region of the exterior surfaces, each dimple in the localized region has a surface area, and a ratio of a sum of the surface area of each dimple within the localized region of the leading portion to a total area of the region is between 1:4 and 1:3.

In a further embodiment of any of the foregoing embodiments, the stator case is a mid-turbine frame.

In a further embodiment of any of the foregoing embodiments, the stator case is a turbine exhaust case.

In a further embodiment of any of the foregoing embodiments, the turbine exhaust case supports a bearing system.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
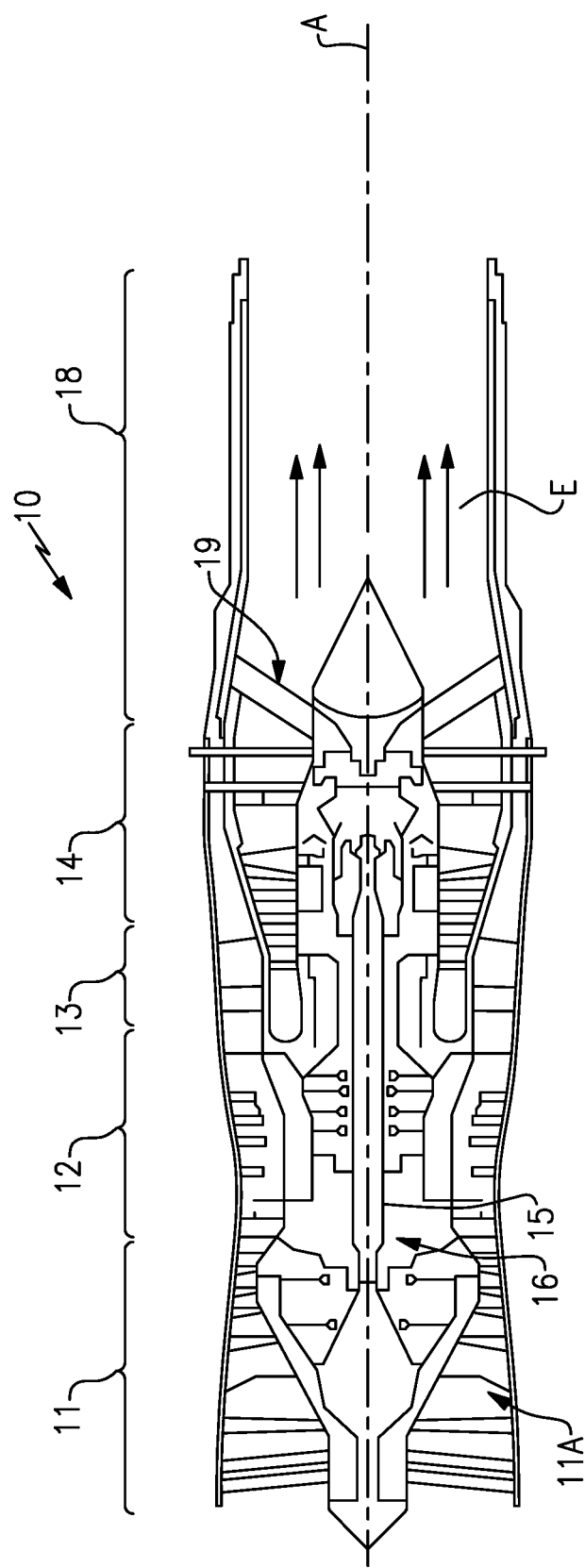
FIG. 1 illustrates a gas turbine engine, according to an embodiment.

FIG. 1 illustrates a gas turbine engine 10 according to an embodiment. The engine 10 includes a fan section 11 including a fan 11A having a row of fan blades, a compressor section 12, a combustor section 13, and a turbine section 14. Air entering into the fan section 11 is initially compressed and fed to the compressor section 12. In the compressor section 12, the incoming air from the fan section 11 is further compressed and communicated to the combustor section 13. In the combustor section 13, the compressed air is mixed with gas and ignited to generate a hot exhaust stream E. A shaft 15 interconnects the turbine section 14 to the fan and compressor sections 11, 12 to provide a single spool 16, which is rotatable about an engine central longitudinal axis A. The hot exhaust stream E is expanded through the turbine section 14 to drive the fan section 11 and the compressor section 12. The exhaust gasses in the exhaust stream E flow from the turbine section 14 and through an exhaust liner assembly 18, which includes a turbine exhaust case (TEC) 19 to support the shaft 15.

Figure 2:
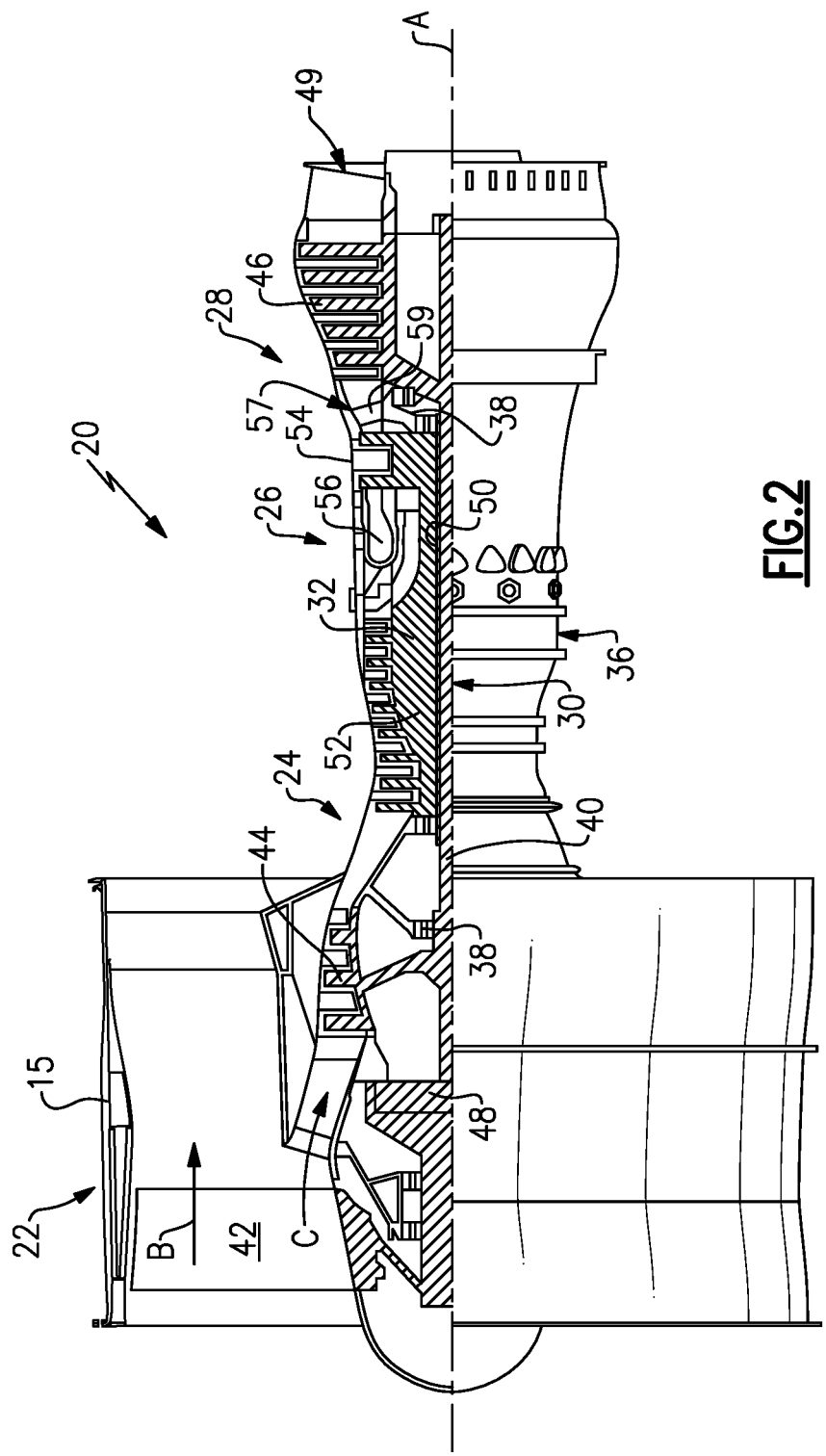
FIG. 2 illustrates a gas turbine engine, according to another embodiment.

FIG. 2 schematically illustrates a gas turbine engine 20 according to another embodiment. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct defined within a nacelle 23, and also drives air along a core flow path C for compression and communication into the combustor section 26 then expansion through the turbine section 28. Although the depicted as a two-spool turbofan gas turbine engine in the disclosed non-limiting embodiment, it should be understood that the concepts described herein are not limited to use with two-spool turbofans as the teachings may be applied to other types of turbine engines including single-spool, such as the engine 10 of FIG. 1, and three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. Aft of the low pressure turbine 46 is a turbine exhaust case 49. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of 1 bm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]^0.5. The "Low corrected fan tip speed" as disclosed herein according to one non-limiting embodiment is less than about 1150 ft/second (350.5 meters/second).

The example engines 10, 20 can be incorporated into a vehicle or system to provide propulsion, including commercial and military aerospace systems such as manned and unmanned aircraft and missile systems. Other subsystems including auxiliary power units (APU), and other systems such as marine and ground-based systems, can benefit from the teachings herein.

Figure 3:
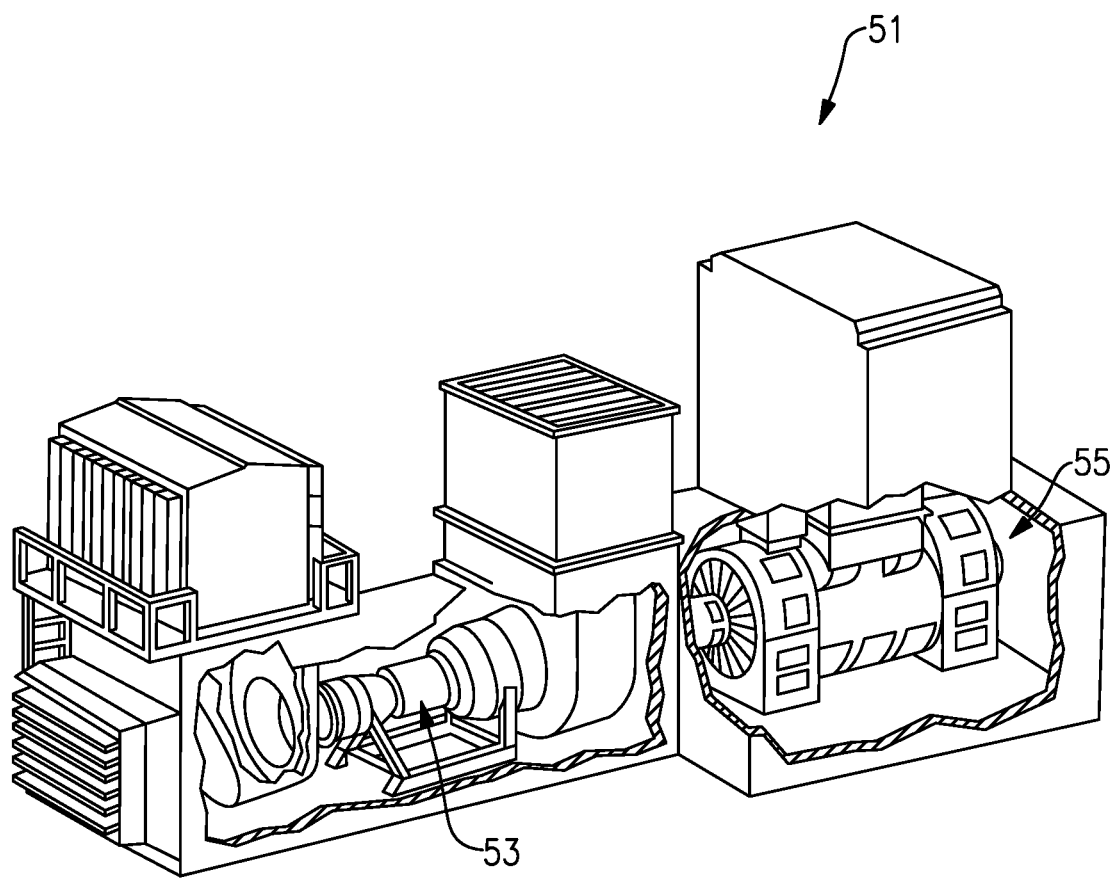
FIG. 3 illustrates a gas turbine engine, according to another embodiment.

Referring now to FIG. 3, an example industrial gas turbine engine assembly 51 includes a gas turbine engine 53 that is mounted to a structural land-based frame to drive a generator 55. The example gas turbine engine 53 includes many of the same features described in the gas turbine engines 10, 20 illustrated in FIGS. 1 and 2, and operates in much the same way. The land-based industrial gas turbine engine 53, however, may include additional features such as a shaft to drive the generator 55 and is not constrained by the same weight constrictions that apply to an aircraft mounted gas turbine engine 20. In addition, the example gas turbine engine 53 does not include a fan.

Figure 4:
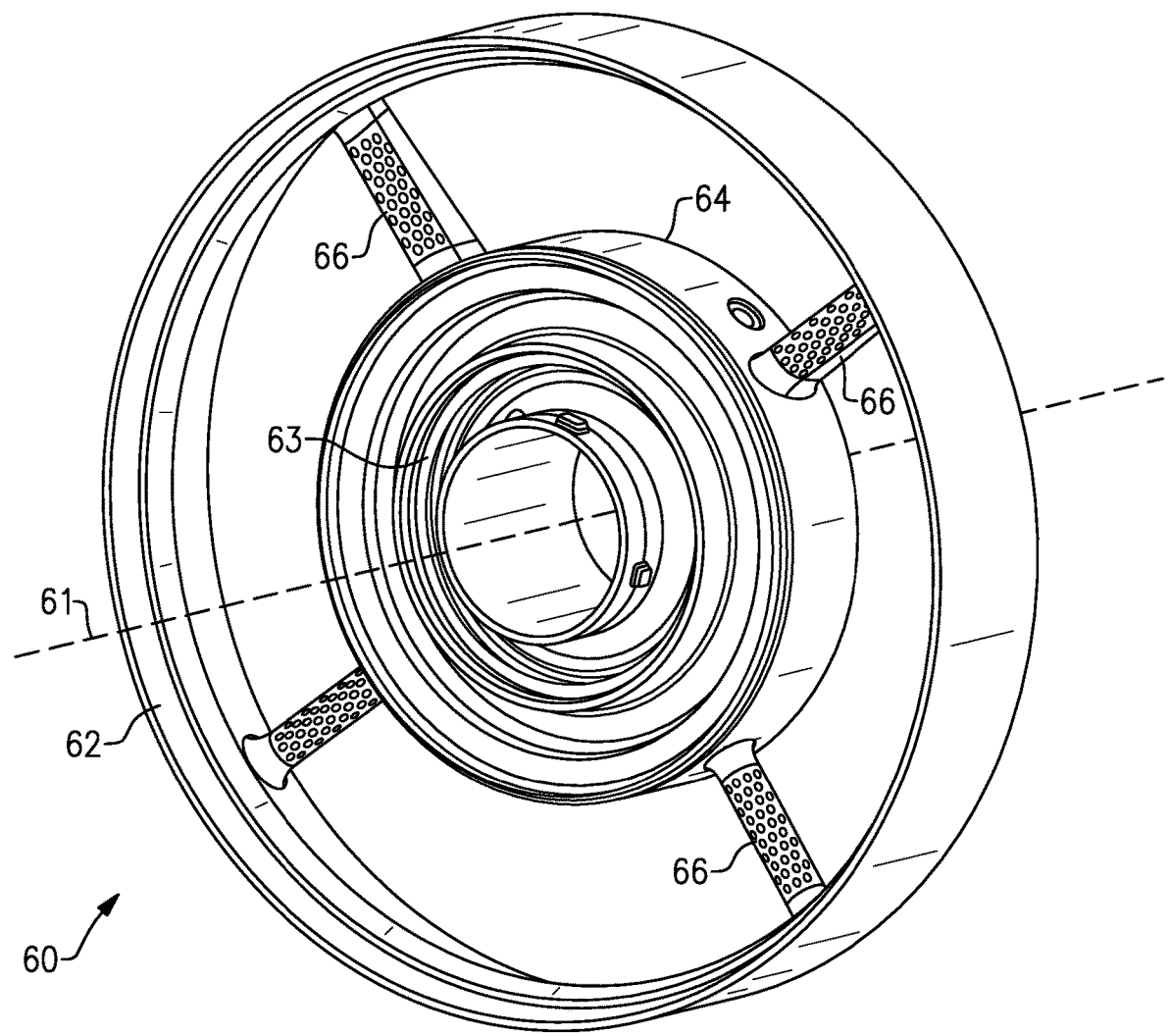
FIG. 4 illustrates a perspective view of a case according to an embodiment.

Turning to FIG. 4, a case 60 according to an embodiment is shown. The case 60 can be incorporated in a gas turbine engine, such as the engines 10, 20 of FIGS. 1 and 2. In the illustrated embodiment, the case 60 is a TEC, which can be utilized for the TEC 19 in FIGS. 1 and 2. Although the disclosure primarily refers to the case 60 with respect to a TEC, other applications can benefit from the teachings herein, including rows of stators, vanes, and seals at multiple locations in an engine. For example, the case 60 can be a mid turbine frame such as the mid turbine frame 57 of FIG. 2.

The case 60 includes an outer ring 62 extending at least partially about an inner ring 64. The rings 62, 64 form an annular flow path and extend along axis 61 which can coincide or be parallel with the engine axis A. The inner ring 64 may include a bearing chamber 63. The bearing chamber 63 can define one of the bearing systems 38 of FIG. 1, for example, to support one or more bearings. The inner ring 64 is supported relative to the outer ring 62 by a plurality of circumferentially spaced apart struts 66. The struts 66 can be load bearing to transfer loads between the bearing chamber 63 and the outer ring 62, and to the engine static structure 36. In illustrated embodiments, the case 60 has four struts 66. In other embodiments, the case 60 has fewer or more than four struts 66.

In an example wherein the case 60 is a TEC, the case 60 guides exhaust stream E flow between the surfaces of the rings 62, 64. Directing the exhaust stream E and minimizing pressure drop therein affect overall performance of the engines 10, 20.

Figure 5:
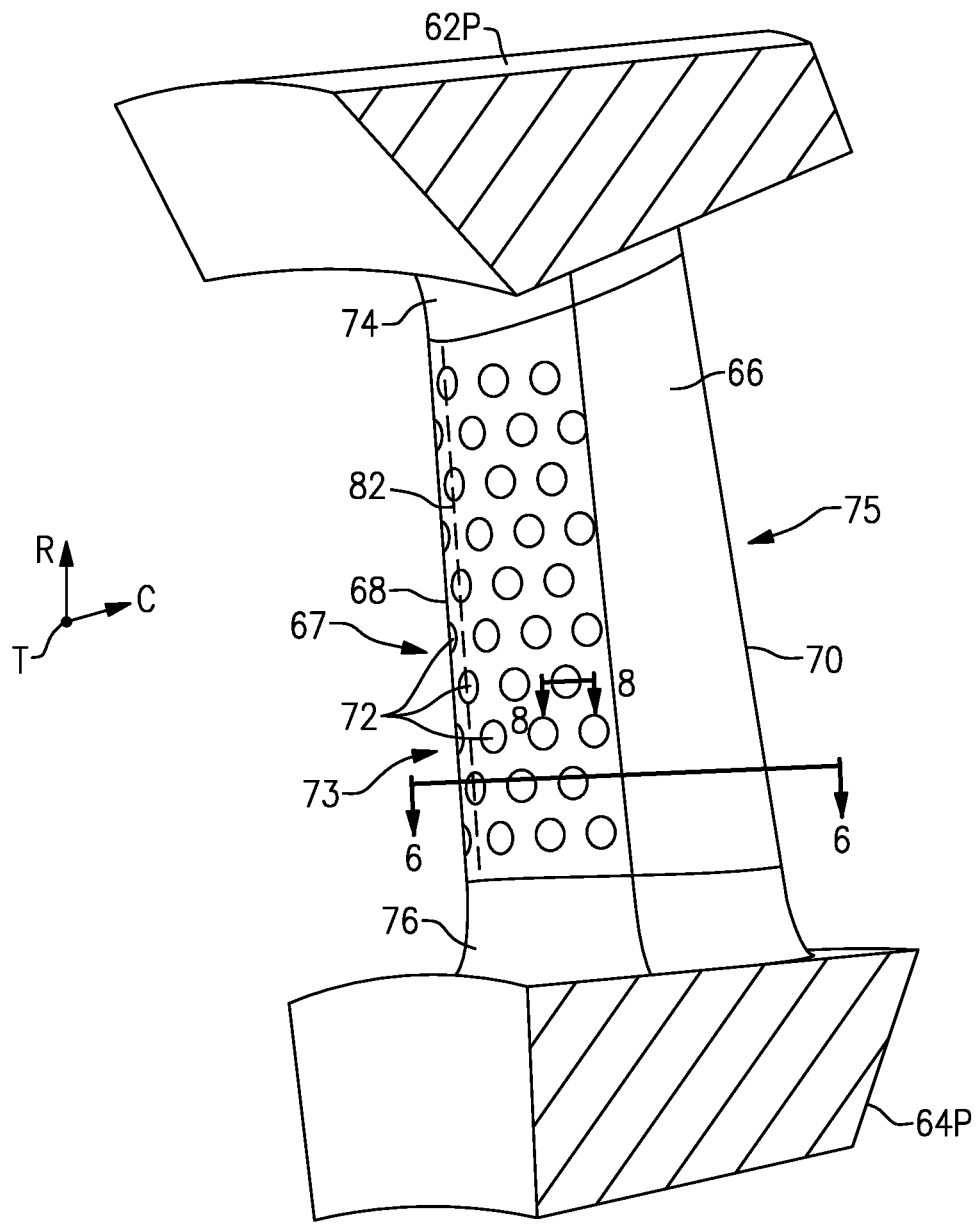
FIG. 5 illustrates a perspective view of a strut in the case of FIG. 4.

Turning to FIG. 5, with continuing reference to FIG. 4, each strut 66 includes an airfoil section 67 extending in a spanwise or radial direction R relative to the axis 61, between a first platform 64P and a second platform 62P. Each strut 66 can have an outer fillet 74 where it meets the second platform 62P and an inner fillet 76 where it meets the first platform 64P. The platforms 64P, 62P can define segments of the inner ring 64 and outer ring 62, respectively, and can be arranged in an array about the axis 61.

Figure 6A:
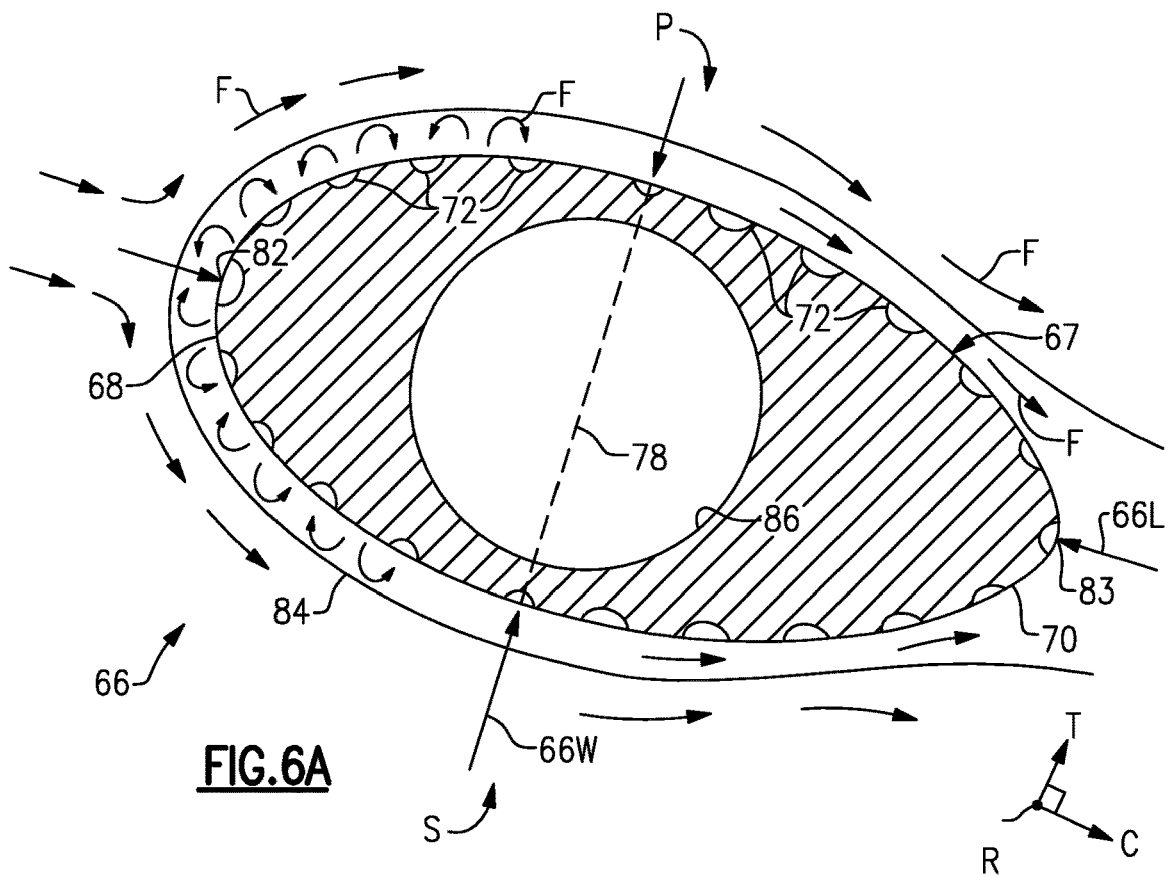
FIG. 6A is a section view along line 6-6 of FIG. 5 according to an embodiment.
Figure 6B:
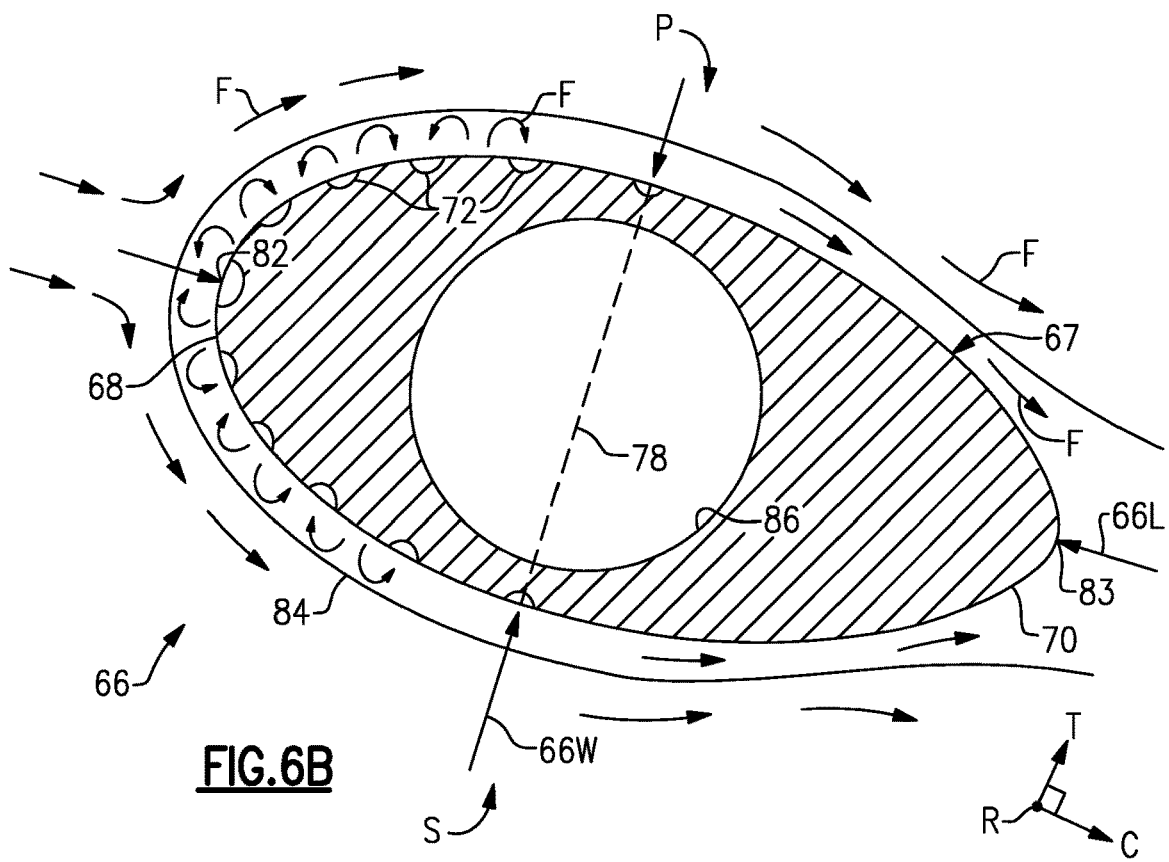
FIG. 6B is a section view along line 6-6 of FIG. 5 according to another embodiment.

Referring to FIGS. 6A and 6B, with continuing reference to FIG. 5, the airfoil section 67 extends in a thickness direction T between a first side P and second side S to define a chord width 66W. According to an embodiment, the first side P is a pressure side and the second side S is a suction side. According to other embodiments, the airfoil section 67 is symmetrical without a defined pressure side and suction side. For the purposes of this disclosure, the chord width 66W is the maximum distance between the first side P and second side S at a given span position. The airfoil section 67 also extends in a chordwise direction C between a leading edge 82 and a trailing edge 83 to define a chord length 66L. Exterior surfaces of the airfoil section 67 define a leading portion 68 between the leading edge 82 and a widest location 78 of the airfoil section 67 relative to the thickness direction T, and a trailing portion 70 between the widest location 78 and the trailing edge 83. The widest location 78 at a given span position of the strut 66 is defined as a pair of points along the first side P and second side S that correspond to the chord width 66W. The strut 66 may have a hollow and radially extending strut passage 86. The core passage 86 can house features extending between the outer and inner rings 62, 64, such as lubrication or service lines and cables.

The fillets 74, 76 and trailing portion 70 can be free of any dimples 72 due to the diminishing returns in pressure drop mitigation relative to expense and difficulty associated with producing dimples on the fillets 74, 76 and trailing portion 70, as shown in FIG. 6B. In embodiments, one or more dimples 72 are defined between the widest portion 78 and trailing edge 83 as shown in FIG. 6A.

Figure 7:
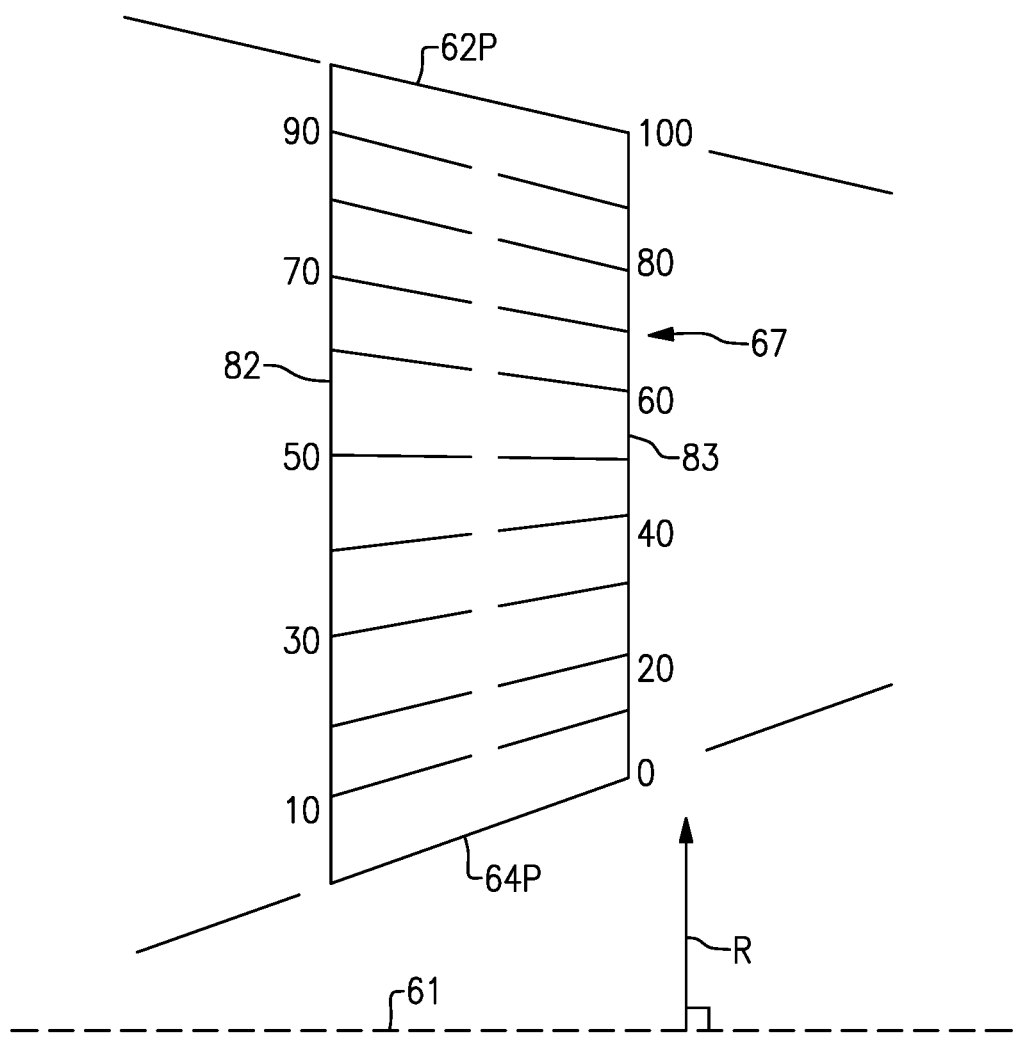
FIG. 7 is a schematic view of span positions for a strut.

Referring to FIG. 7, with continuing reference to FIGS. 6A, 6B and 5, span positions of the airfoil section 67 are schematically illustrated from 0% to 100% in 10% increments to define a plurality of sections. Each section at a given span position is provided by a conical cut that corresponds to the shape of segments of the gas flowpath, as shown by large dashed lines. The 0% span position corresponds to the radially innermost location where the airfoil section 67 meets the inner fillet 76 joining the airfoil section 67 to the first platform 64 P. A 100% span position corresponds to a radially outermost location where the airfoil section 67 meets the outer fillet 74 joining the airfoil section 67 to the second platform 62P. At each span position, exterior surfaces define an exterior contour of the airfoil section.

The airfoil section 67 can have a relatively wide geometry, though the teachings of this disclosure can be effective when applied to airfoil sections 67 with relatively narrower or wider geometry. In embodiments, a ratio of the chord width 66W to the chord length 66L is at least 1:2 for at least some of the span positions. In embodiments, the ratio of the chord width 66W to the chord length 66L is between 0.3:1 and 1:1, or more narrowly between 1.2:2 and 1.5:2, for example.

The exterior surfaces of the airfoil section 67 define a plurality of dimples 72 in at least the leading portion 68. For the purposes of this disclosure, a dimple refers to a surface depression of known shape and size, which excludes surface irregularities due to manufacturing imperfections. The plurality of dimples 72 extend across a localized region 73 of the leading portion 68. The localized region 73 can be effective in regions of attached flow on the exterior surfaces of the airfoil section 67, for example. A size and shape of the localized region 73 can be set with respect to a defined incidence angle of incoming airflow and Reynolds number values, for example. In embodiments, the localized region 73 has a density of between 22 and 28 dimples 72 per square inch, or between 3.41 and 4.34 dimples 72 per square centimeter. A remainder of the exterior surfaces of the airfoil section, including the trailing portion 70, an outer fillet 74, and inner fillet 76, defines a region 75 free of any dimples 72. A ratio of a surface area of the localized region 73 to a surface area of the region 75 free of any dimples 72 can be between 1:2 and 1:4.

At least one of the dimples 72 is separated from the leading edge 82 by a distance of no more than 5% of a distance between the leading edge 82 and the trailing edge 83 measured along the exterior contour of the airfoil section 67 at the respective span positions. In the illustrated embodiment of FIGS. 5, 6A, and 6B, one or more of the dimples 72 are defined along the leading edge 82.

Example methods of manufacturing a strut 66 with dimples 72 can include rolling the dimples 72 into sheet metal used to form the struts 66 or shaping a mold cavity to provide the dimples 72 for casting struts 66. Dimples 72 in sheet metal can be distorted when forming a strut 66, but the dimples 72 need not be perfectly circular to operate as intended.

Figure 8A:
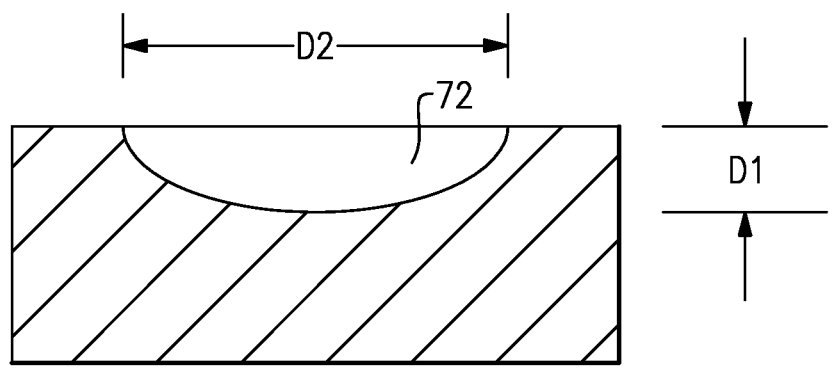
FIG. 8A is a section view along line 8-8 of FIG. 5, according to an embodiment.
Figure 8B:
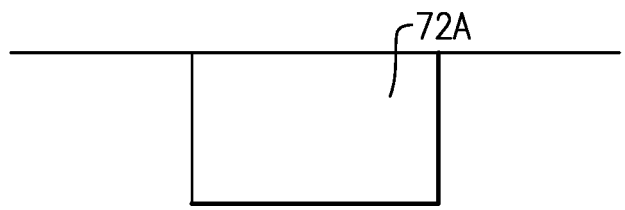
FIG. 8B is a section view along line 8-8 of FIG. 5, according to another embodiment.
Figure 8C:
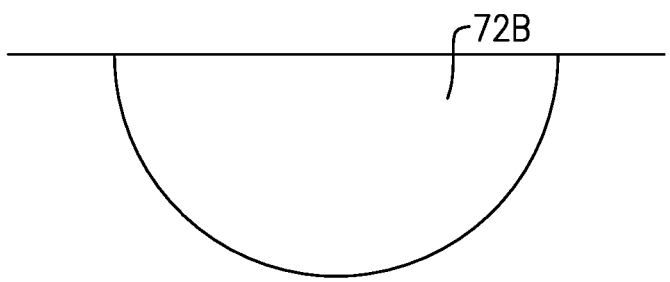
FIG. 8C is a section view along line 8-8 of FIG. 5, according to another embodiment.

As shown in FIG. 8A, each dimple 72 has a depth D1 and a diameter D2. According to an embodiment, the depth D1 is equal to about 0.011 inches, and the diameter D2 is equal to about 0.12 inches. Each dimple 72 can have an area of between 0.080 and 0.015 square inches. A ratio of a sum of the surface area of each dimple 72 within the localized region 73 to a total surface area of the localized region 73 can be between 1:3 and 1:4. Although the illustrated embodiments of FIGS. 4-8A show dimples 72 having shallow round or oblong shapes, the dimples 72 can have other geometries such as partial spheres 72A or cubes 72B, shown in FIGS. 8B and 8C, respectively.

Figure 9B:
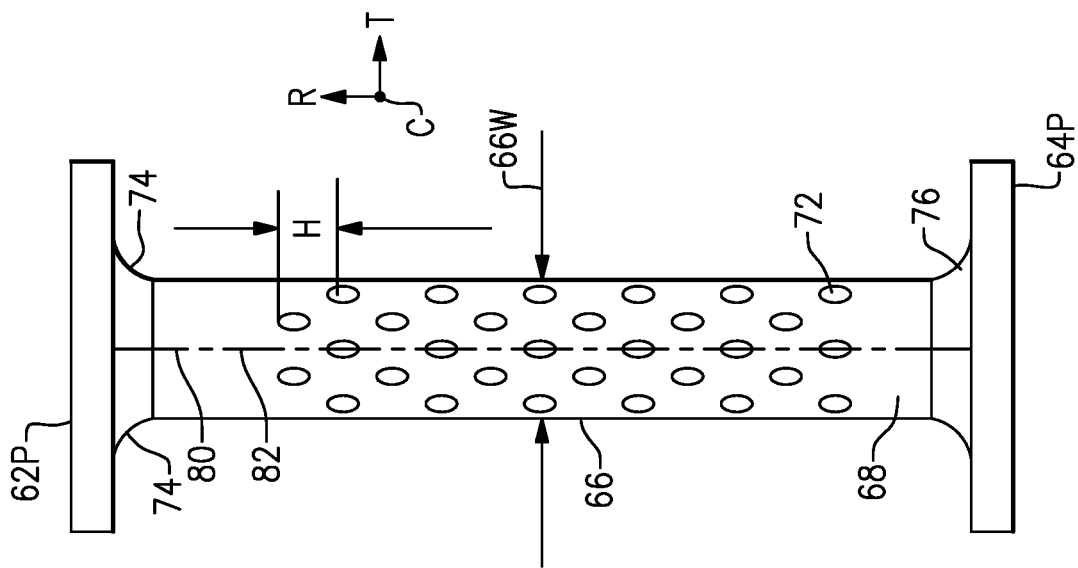
FIG. 9B is an axial view of a leading edge of the strut of FIG. 5.
Figure 9A:
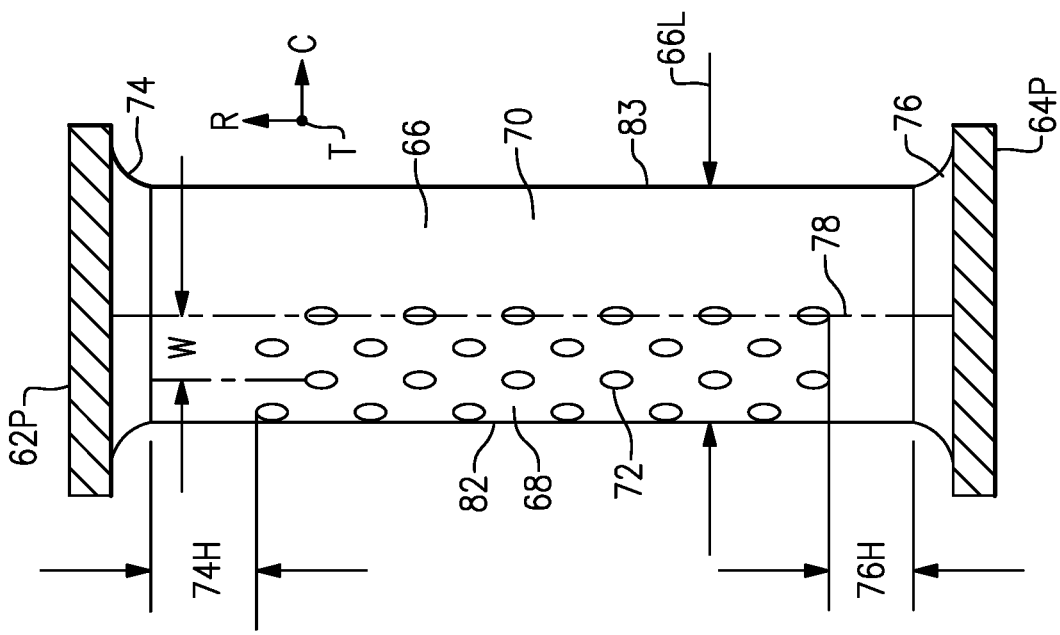
FIG. 9A is a side view of the strut of FIG. 5.

FIGS. 9A and 9B illustrate a distribution of dimples 72 according to an embodiment. The dimples 72 are generally arranged into rows of radially extending columns. A center to center distance W between adjacent dimples 72 in the same row, measured along a contour of the leading portion 68, can be equal to about 0.4 inches, for example. A center to center distance H between adjacent rows can be equal to about 0.2 inches, for example. The fillets 74, 76 are separated from nearest edges of nearest dimples by respective distances 74H, 76H of equal to about 0.25 inches.

The illustrated spacing of columns and rows creates a repeating pattern of dimples 72. Within the repeating pattern, all rows can be separated from adjacent rows by approximately equal distances, and all dimples within each row can be separated from adjacent dimples by approximately equal distances. For example, a surface area covered by the repeating pattern can have about 25 of the dimples 72 per square inch. In another embodiment, a surface area covered by the repeating pattern can have between 22 and 28 dimples 72 per square inch. Distribution of dimples 72 can be different or non-uniform.

The dimensions disclosed above relating to the dimples 72 are exemplary, and the dimensions may be scaled up or down as appropriate for differing applications.

The pattern of dimples 72 can be generally continuous and uninterrupted across the leading edge 82. In other words, the pattern does not change at the leading edge 82. Adjacent dimples 72 in the same row on opposite sides of the leading edge 82 can be separated by approximately the same distance measured along the exterior contour of the airfoil section as other adjacent dimples 72 in the same row.

Returning to FIGS. 6A and 6B, the dimples 72 are distributed across the leading portion 68 to introduce turbulence to exhaust flow F as it passes along the exterior surface of the airfoil section 67. Introducing turbulence to the exhaust flow F at the leading portion 68 creates a turbulent boundary layer 84 that clings to the exterior surfaces as it passes downstream. Due to the turbulence, the boundary layer 84 will continue to cling to the exterior contour of the strut 66 even as the exhaust flow F in the boundary layer 84 passes the widest location 78 of the strut 66 to the relatively smooth trailing portion 70. Turbulence reduces flow separation and thereby mitigates pressure drop.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A strut for a gas turbine engine comprising: an airfoil section extending in a spanwise direction between a first platform and a second platform, extending in a chordwise direction between a leading edge and trailing edge to define a chord length, and extending in a thickness direction between a first side and a second side to define a chord width; a leading portion is defined by an exterior surface of the airfoil section between the leading edge and a widest location of the airfoil section relative to the thickness direction, and a trailing portion between the widest location and the trailing edge; a respective exterior contour is established by the exterior surface for each span position between a 0% span position and a 100% span position, and a ratio of the chord width to the chord length of at least 1:2 for at least some span positions; and a plurality of dimples are defined in the exterior surface in the leading portion, wherein the plurality of dimples extend across a localized region of the exterior surfaces, a remainder of the exterior surfaces defines a second region free of any dimples, and a ratio of the localized region to the second region is between 1:2 and 1:4, and wherein each dimple of the plurality of dimples in the localized region has a surface area, and a ratio of a sum of the surface area of each dimple within the localized region to a total area of the localized region is between 1:3 and 1:4.

2. The strut of claim 1, wherein the trailing portion is free of any dimples.

3. The strut of claim 1, wherein at least one dimple of the plurality of dimples is separated from the leading edge by a first distance of no more than 5% of a second distance between the leading edge and the trailing edge along the exterior contour for at least some of the span positions.

4. The strut of claim 3, wherein the at least one dimple is defined along the leading edge.

5. The strut of claim 1, wherein the plurality of dimples are distributed in the localized region such that the localized region has a density of between 3.41 and 4.34 dimples per square centimeter.

6. The strut of claim 1, wherein the trailing portion is free of any dimples.

7. The strut of claim 6, wherein the localized region has a density of between 3.41 and 4.34 dimples per square centimeter at a majority of span positions.

8. The strut of claim 6, wherein the first side is a pressure side and the second side is a suction side.

9. The strut of claim 1, wherein the first platform and second platform are respective portions of an inner ring and outer ring of a stator case.

10. A turbine exhaust case comprising: an inner ring extending along an axis; an outer ring extending at least partially about the inner ring; and a plurality of circumferentially spaced apart struts extending radially between the inner ring and the outer ring with respect to the axis, wherein each strut of the plurality of struts comprises: an airfoil section extending in a spanwise direction between the inner ring and the outer ring, extending in a chordwise direction between a leading edge and trailing edge to define a chord length, and extending in a thickness direction between a first side and a second side to define a chord width; a leading portion is defined by an exterior surface of the airfoil section between the leading edge and a widest location of the airfoil section relative to the thickness direction, and a trailing portion between the widest location and the trailing edge; a respective exterior contour is established by the exterior surface for each span position between a 0% span position and a 100% span position; and a plurality of dimples are defined in the exterior surface, at least one dimple of the plurality of dimples is separated from the leading edge by a first distance of no more than 5% of a second distance between the leading edge and the trailing edge along the exterior contour, wherein the plurality of dimples extend across a localized region of the exterior surface, a remainder of the exterior surface defines a second region free of any dimples, and a ratio of the localized region to the second surface area is between 1:2 and 1:4; and wherein each dimple of the plurality of dimples in the localized region has a surface area, and a ratio of a sum of the surface area of each dimple within the localized region to a total area of the localized region is between 1:3 and 1:4.

11. The turbine exhaust case of claim 10, wherein the trailing portion is free of any dimples.

12. The turbine exhaust case of claim 10, wherein at least one of the plurality of dimples is defined along the leading edge.

13. The turbine exhaust case of claim 10, wherein each strut of the plurality of struts has an inner fillet where the strut meets the inner ring and an outer fillet where the strut meets the outer ring.

14. A gas turbine engine comprising:
a compressor section;
a turbine section; and
a stator case comprising:
   an inner ring extending along an engine axis;
   an outer ring extending at least partially about the inner ring; and
   a plurality of circumferentially spaced apart struts extending radially between the inner ring and the outer ring with respect to the axis, wherein each strut comprises:
      an airfoil section extending in a spanwise direction between the inner ring and the outer ring, extending in a chordwise direction between a leading edge and trailing edge to define a chord length, and extending in a thickness direction between a first side and a second side to define a chord width;
      a leading portion is defined by an exterior surface of the airfoil section between the leading edge and a widest location of the airfoil section relative to the thickness direction, and a trailing portion between the widest location and the trailing edge;
      a respective exterior contour is established by the exterior surface for each span position between a 0% span position and a 100% span position;
      a plurality of dimples is defined in the exterior surface in the leading portion; and
      two or more dimples of the plurality of dimples are defined along the leading edge; wherein the plurality of dimples extend across a localized region of the exterior surface, each dimple in the localized region has a surface area, and a ratio of a sum of the surface area of each dimple within the localized region of the leading portion to a total area of the region is between 1:4 and 1:3.

15. The gas turbine engine of claim 14, wherein the stator case is a mid-turbine frame.

16. The gas turbine engine of claim 14, wherein the stator case is a turbine exhaust case.

17. The gas turbine engine of claim 16, wherein the turbine exhaust case supports a bearing system.

* * * * *